United States Patent [19]

Hostetler

[11] Patent Number: 5,063,878
[45] Date of Patent: Nov. 12, 1991

[54] SUPPORT ASSEMBLY FOR SIDE MOUNT REGULATORS

[75] Inventor: Robert H. Hostetler, Goshen, Ind.

[73] Assignee: Avtron, Inc., Elkhart, Ind.

[21] Appl. No.: 579,150

[22] Filed: Sep. 6, 1990

[51] Int. Cl.[5] ................................................ A01K 39
[52] U.S. Cl. ...................................... 119/72.5; 119/72
[58] Field of Search ....................... 119/72.5, 72, 74; 248/229, 230

[56] References Cited

U.S. PATENT DOCUMENTS

| | | | |
|---|---|---|---|
| 2,705,603 | 4/1955 | Bitz et al. | 248/229 |
| 3,582,006 | 6/1971 | Thompson | 119/72.5 |
| 4,284,036 | 8/1981 | Hostetler | 119/72.5 |
| 4,344,456 | 8/1982 | Hostetler | 137/403 |
| 4,491,088 | 1/1985 | Hostetler | 119/72.5 |
| 4,589,373 | 5/1986 | Hostetler et al. | 119/72.5 |
| 4,637,345 | 1/1987 | Hostetler | 119/72.5 |
| 4,669,422 | 6/1987 | Steudler, Jr. | 119/72 |
| 4,724,797 | 2/1988 | Steudler, Jr. | 119/72 |
| 4,884,528 | 12/1989 | Steudler, Jr. | 119/72 |

FOREIGN PATENT DOCUMENTS

| | | | |
|---|---|---|---|
| 704993 | 3/1965 | Canada | 119/72.5 |
| 326895 | 3/1930 | United Kingdom | 248/229 |

*Primary Examiner*—John G. Weiss
*Attorney, Agent, or Firm*—Jeffers, Hoffman & Niewyk

[57] ABSTRACT

The present invention is a support assembly for a side mount water regulator in a watering system for fowl and small animals. A support bracket is connected to a ballast pipe of the watering system to provide a boss for supporting the regulator when attached. The resulting assembly provides a strong and durable support similar to end mount regulators but allow the regulator to be located anywhere on the conduit of the water supply system.

23 Claims, 2 Drawing Sheets

SUPPORT ASSEMBLY FOR SIDE MOUNT REGULATORS

BACKGROUND OF THE INVENTION

The present invention relates to water supply systems for fowl or small animals. More specifically, the field of the invention is that of mounting structures for regulators of water conduits in an elongated water dispensing assembly.

The proper provision of water is essential for safe and efficient nurturing of fowl and small animals, for example in raising chickens. In water supply systems having one or more dispensers, pressure responsive water flow regulators are employed to ensure that fresh water is reliably dispensed. One prior art pressure responsive liquid flow regulator is disclosed in U.S. Pat. No. 4,344,456, the disclosure of which is hereby explicitly incorporated by reference. The aforementioned regulator is used in combination with a watering system including a plurality of valved dispensers which allow only a limited amount of water to be dispensed each time a fowl or small animal activates the valve. Such a prior art valved dispenser is disclosed in U.S. Pat. No. 4,284,036, the disclosure of which is hereby explicitly incorporated by reference. The water dispensing system is suspended above the ground or floor level, for example by hangers as described in the co-pending application entitled "HANGER FOR WATER SUPPLY SYSTEM AND METHOD OF INSTALLATION", Ser. No. 429,226, filed Oct. 31, 1989, the disclosure of which is explicitly incorporated by reference.

In the aforementioned prior art watering system, a plurality of the valved dispensers are disposed at intervals across a conduit, with the regulator mounted at one end of the conduit. A ballast pipe supports the elongated conduit, with the regulator also being supported by the ballast pipe. The system is attached to hanging wires by hangers keyed to the conduit and engaging the ballast pipe; the system is then suspended at a level convenient for the fowl and small animals to access the dispensers. Water is supplied to the regulator, which provides a relatively constant water pressure within the conduit.

The end mount regulator is directly coupled at one end of the conduit to provide a pressure regulated water supply. A mounting area on the regulator has a radius similar to that of the ballast pipe, and a bracket is attached over the ballast pipe by two screws. With this structure, the regulator is able to withstand collision with a tractor or other heavy object.

However, in some applications the regulator is preferably positioned intermediate the ends of the ballast and conduit assembly. In the prior art, this is accomplished by some means of suspending the regulator adjacent to the conduit so that it can be coupled to a T-joint of the conduit. For example, a chain attached at one end to the regulator and at the other end to the ballast pipe is lifted in the middle portion by an additional hanging wire or chain. However, suspending the regulator by a chain makes it much more susceptible to breakage from collision with a heavy object, and also requires additional suspension for the watering system.

What is needed is a rigid and stable structure for attaching a regulator to a watering conduit intermediate the ends. Also needed is such a structure which minimizes the possibility of breakage. A further need is for a side mount which can be used with preexisting end mount regulator designs.

SUMMARY OF THE INVENTION

The present invention provides a side mount arrangement for a water regulator of a watering system for fowl or small animals. The side mount regulator of the present invention allows the water regulator to be positioned anywhere along the length of the conduit, while providing structural support similar to that of the end mount regulator. The side mount arrangement fits on existing watering system structures, and the end mount regulator can be used with the side mount arrangement.

The side mounting is attached directly to the ballast pipe by an interfacing mounting between the regulator and ballast pipe. The U-shaped mounting is attached to the ballast pipe by clamps, and the mounting has a boss extending outward so that a bracket can be attached to the regulator and engage the boss.

The present invention is, in one form, a watering system for fowl or small animals. The watering system comprises a ballast member, a conduit, dispensing valves, a regulator, and mounting means. The elongated ballast member is coupled to a supporting structure, with the ballast member including two ends and an intermediate portion. A tubular water supply conduit is rigidly attached to the ballast member and is in fluid communication with a plurality of dispensing valves. The dispensing valves provide water to the fowls or small animals, with each dispensing valve including means for permitting liquid flow when actuated by a fowl or small animal. The regulator serves to regulate the water provided to the dispensing valves, and is coupled to the water supply and is in fluid communication with the conduit. The mounting means connects the regulator to the intermediate portion of the ballast member. The mounting means includes a bracket with a mounting boss for supporting the regulator, and at least one clamp for attaching the bracket to the ballast member.

One object of the present invention is to provide a rigid and stable structure for attaching a regulator to a watering conduit intermediate the ends.

Another object of the present invention is to provide a side mount assembly which minimizes the possibility of breakage.

A further object of the present invention is to provide a side mount assembly which can be used with preexisting end mount regulator designs.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting the scope of the invention in any manner.

DESCRIPTION OF THE PREFERRED EMBODIMENT

Figure 1:
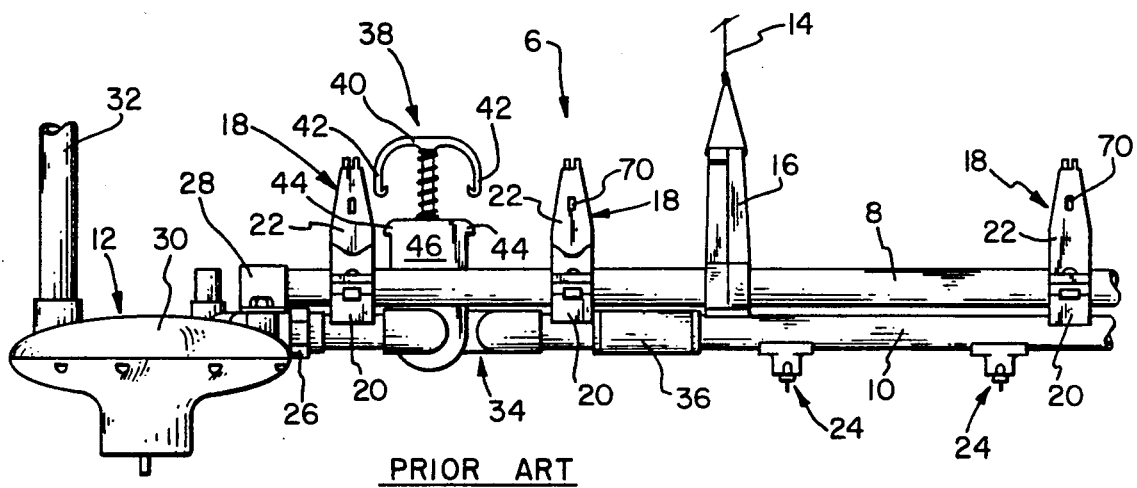
FIG. 1 is a perspective view of a prior art end mount regulator.

The present invention relates to watering systems for fowl or small animals, such as chickens. The present invention may be better understood by reference to prior art end mount and side mount watering systems. In FIG. 1, prior art end mount watering system 6 comprises ballast pipe 8, conduit 10, and end mount regulator 12. Ballast pipe 8 is suspended over the ground by flexible lines 14 which are attached to hangers 16, as described in the aforementioned patent application Ser. No. 429,226. Attached to ballast pipe 8 are wrap connectors 18 which have a lower portion 20 integrally formed on conduit 10 and an upper portion 22 which extends over ballast pipe 8. Upper portion 22 and lower portion 20 are screwed together and rigidly mount conduit 10 under pipe 8. Conduit 10 also has a plurality of dispenser valves 24 for selectively dispensing small amounts of water when activated by a fowl or small animal, as described in the aforementioned U.S. Pat. No. 4,284,036.

Regulator 12 is connected at one end of watering system 6, engaging threaded plastic fitting 26 of conduit 10 and having mounting bracket 28 screwed into end mount regulator top 30. Mounting bracket 28 extends over ballast pipe 8 for rigidly securing regulator 12. Regulator 12 is also connected with a water supply (not shown) by water supply hose 32. U.S. Pat. No. 4,344,456 describes a pressure responsive liquid flow regulator similar to regulator 12 of the present invention. Other types of regulators can also be used.

Water is supplied through hose 32 to regulator 12, which introduces a controlled water flow through fitting 26 into conduit 10. Intermediate fitting 26 and the first dispenser valve 24 is a U-joint 34 which is attached to conduit 10 by conduit connector 36. Latching valve 38 is located on U-joint 34 and extends above the height of ballast pipe 8. Valve 38 is preferably located above conduit 10 and ballast pipe 8 because accessing a location below conduit 10 is undesirable. The location below conduit 10 is the surface occupied by the fowl or small animals, and that surface may contain malodorous or unsanitary materials. Spring latch 40 is located on the top of valve 38, and has arms 42 which snap over and engage projections 44 of valve body 46. Spring latch 40 can be turned to disengage arms 42 so they are no longer restrained by projections 44. In the engaged position, valve 38 is closed and no water can pass through U-joint 34.

Figure 2:
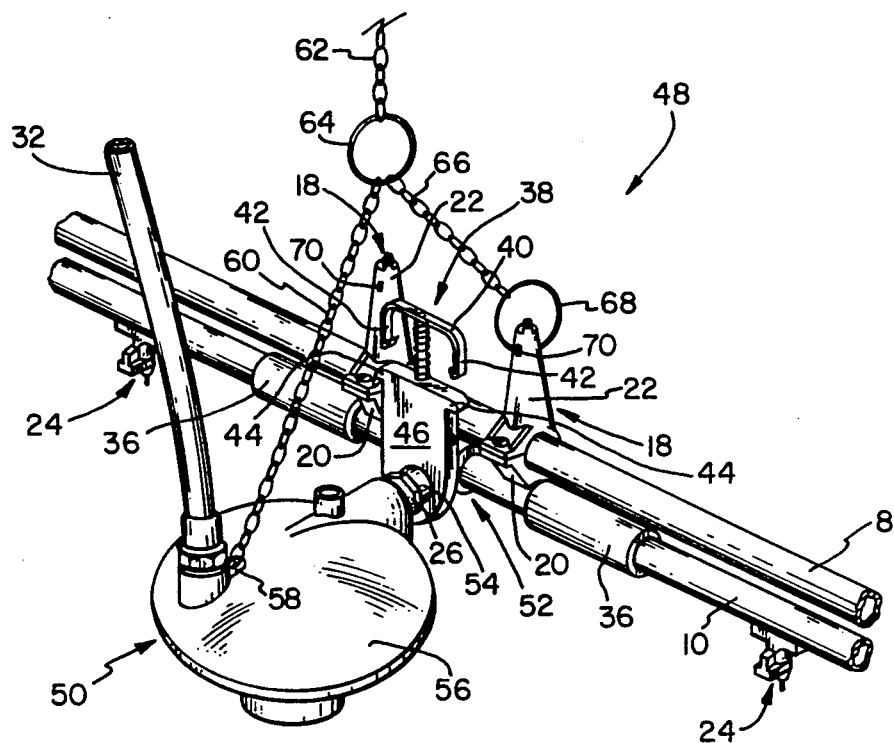
FIG. 2 is a perspective view of a prior art side mount regulator.

The end mount regulator assembly of FIG. 1 provides a secure mounting for regulator 12 because regulator 12 is directly attached to ballast pipe 8. Mounting bracket 28 is secured by screws onto end mount regulator top 30 and provides sturdy and rigid support. When a tractor or other heavy object collides with regulator 12, the plastic parts connecting regulator 12 and conduit 10 are more likely to absorb the shock without breakage. However, to allow the connection of a water regulator at a position intermediate the ends of the conduit and ballast pipe of a watering system, the prior art arrangement depicted in FIG. 2 is used. Side mount watering system 48 is similar to watering system 6 except for the differences in attaching regulator 50 which are noted below.

T-joint 52 is located at an intermediate position on conduit 10, attached at each end by conduit connectors 36. Extension portion 54 of T-joint 52 projects outward from conduit 10 and includes latching valve 38 and fitting 26. Side mount regulator top 56 includes tab 58 for engaging support chain 60 which holds up regulator 50. Suspension chain 62 is linked to support chain 60 by ring link 64. Ring link 64 is also connected to support chain 66 which extends from support ring 68. Notches 70 in upper portion 22 receive support ring 68 so that suspension chain 62 holds a distributed load of both wrap connector 18 and regulator 50. However, regulator extension portion 54 is more susceptible of breaking when a force is applied, because ballast pipe 8 is heavier and more rigid than regulator 50.

Figure 3:
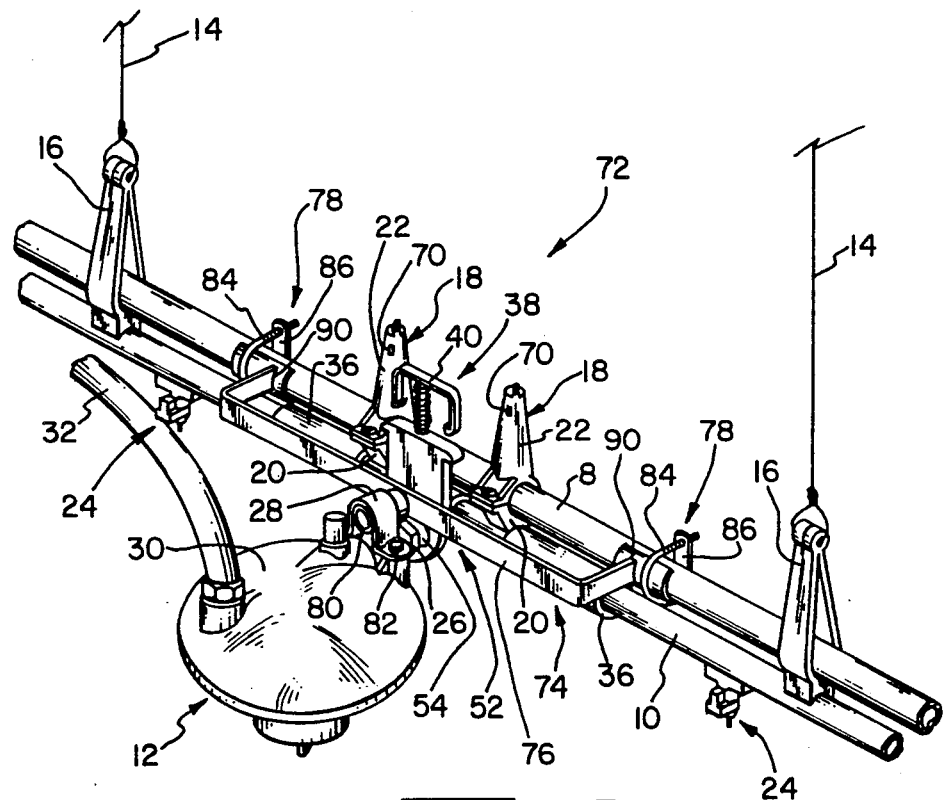
FIG. 3 is a perspective view of the side mount regulator of the present invention.
Figure 4:
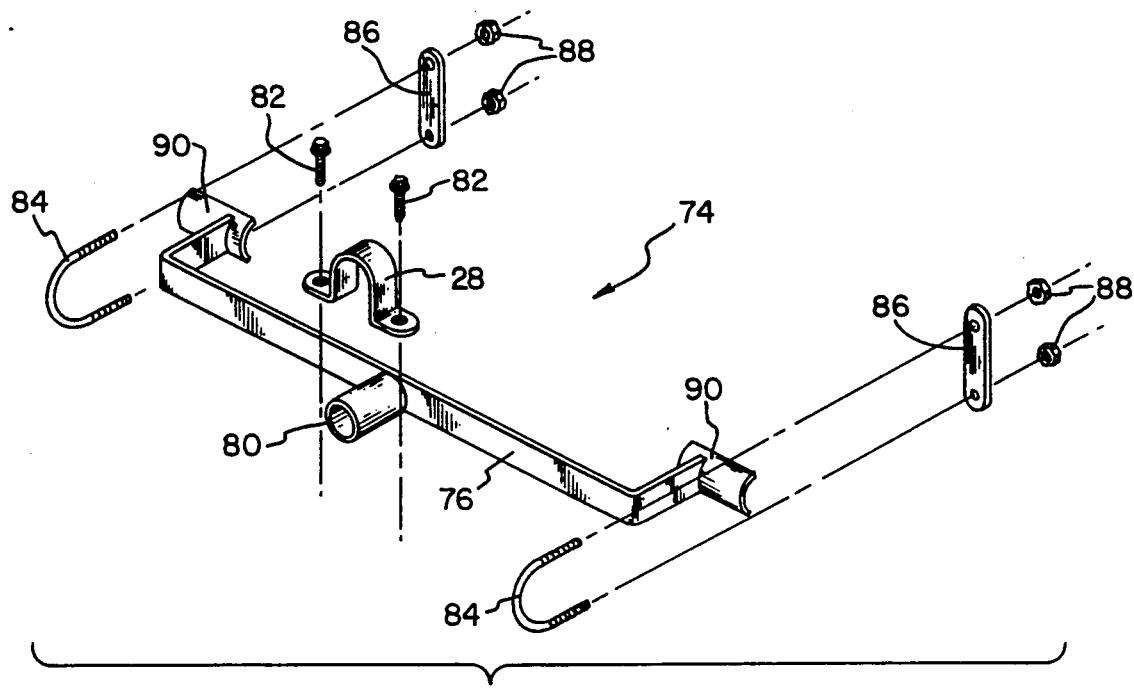
FIG. 4 is an exploded view of the side mount assembly of FIG. 3.

In accordance with the present invention, watering system 72 includes side mount assembly 74 which allows regulator 12 to be mounted at a position intermediate the ends of ballast pipe 8 and conduit 10, see FIGS. 3 and 4. Watering system 72 is similar to end mount watering system 6 except that regulator 12 is attached at an intermediate position on conduit 10, and conduit 10 is coupled with T-joint 52.

Side mount assembly 74 includes a U-shaped support bracket 76 attached to ballast pipe 8 by clamps 78. Support bracket 76 includes a mounting boss 80 which is a cylindrical extension of bracket 76 having the same general shape as ballast pipe 8. Mounting bracket 28 is attached by screws 82 to end mount regulator top 30 and thereby supports regulator 12.

Clamps 78 include U-bolts 84, plate 86, and nuts 88. On one side of ballast pipe 8 U-bolts 84 engage feet 90 of support bracket 76, and on the other side plate 86 is placed on pipe 8 and nuts 88 are attached. Other methods of attaching support bracket 76 to pipe 8 which rigidly secure bracket 76 are compatible with the present invention, such as straps or other types of clamps.

Support bracket 76 is positioned on pipe 8 by first loosely tightening nuts 88 so that bracket 76 is movable, then connecting T-joint 52 with regulator 12. Next, bracket 76 is moved to place mounting boss 80 adjacent to end mount regulator top 30 and then mounting bracket 28 is attached to engage boss 80. When mounting bracket 28 is secured over boss 80, nuts 88 are tightened so that support bracket 76 is no longer movable, thus rigidly securing the position of regulator 12 and protecting it from breakage due to collisions with other objects.

While this invention has been described as having a preferred design, the present invention can be further modified within the spirit and scope of this disclosure. This application is therefore intended to cover any variations., uses, or adaptations of the invention using its general principles. Further, this application is intended to cover such departures from the present disclosure as come within known or customary practice in the art to which this invention pertains and which fall within the limits of the appended claims.

What is claimed is:

1. A watering system for fowl or small animals, said watering system including a water supply and a supporting structure, said watering system comprising:

an elongate ballast member coupled to the supporting structure, said ballast member including two ends and an intermediate portion;

a tubular water supply conduit rigidly attached to said ballast member;

a plurality of dispensing valves for providing water to the fowl or small animals, each said dispensing valve in fluid communication with said conduit, each said dispensing valve including means for permitting liquid flow when actuated by a fowl or small animal;

regulator means for regulating the water provided to said dispensing valves, said regulator means coupled to the water supply, said regulator means being in fluid communication with said conduit; and mounting means for connecting said regulator means to said intermediate portion of said ballast member, said mounting means including a support bracket means for supporting said regulator means, and said mounting means also including at least one clamp attaching said support bracket means to one of said ballast member and said conduit.

2. The watering system of claim 1 wherein said regulator means extends laterally from said ballast member.

3. The watering system of claim 1 wherein said conduit includes a T-joint fluidly coupling said regulator means and said conduit.

4. The watering system of claim 1 wherein said bracket means includes a mounting bracket for attaching said regulator means to said support bracket means.

5. The watering system of claim 4 wherein said mounting bracket is secured to said regulator means by screws.

6. The watering system of claim 1 further comprising a valve means for opening and closing said fluid communication between said regulator means and said conduit.

7. The watering system of claim 6 wherein said valve means includes a spring latch.

8. The watering system of claim 3 further comprising valve means for opening and closing said fluid communication between said regulator means and said conduit, said valve means disposed intermediate said T-joint and said regulator means.

9. The watering system of claim 8 wherein said support bracket means includes a U-shaped portion and said valve means extends in a space defined between said support bracket means U-shaped portion and said ballast member.

10. The watering system of claim 1 wherein said mounting means includes at least two clamps for attaching said support bracket means to said ballast member.

11. The watering system of claim 10 wherein said support bracket means includes feet which engage and are guided on said ballast member, and said clamps can be adjusted so that said support bracket means is movable on said ballast member.

12. The watering system of claim 11 wherein said clamps each include a U-bolt assembly which engages at least one of said feet of said support bracket means.

13. A watering system for fowl or small animals, said watering system including a water supply and a supporting structure, said watering system comprising:

an elongate ballast member coupled to the supporting structure, said ballast member including two ends and an intermediate portion;

a tubular water supply conduit rigidly attached to said ballast member;

a plurality of dispensing valves for providing water to the fowl or small animals, each said dispensing valve in fluid communication with said conduit, each said dispensing valve including means for permitting liquid flow when actuated by a fowl or small animal;

regulator means for regulating the water provided to said dispensing valves, said regulator means coupled to the water supply, said regulator means being in fluid communication with said conduit; and mounting means for connecting said regulator means to said intermediate portion of said ballast member, said mounting means including a support bracket with a mounting boss for supporting said regulator means, and said mounting means also including at least two clamps for attaching said support bracket to said ballast member.

14. The watering system of claim 13 wherein said regulator means extends laterally from said ballast member.

15. The watering system of claim 13 wherein said conduit includes a T-joint fluidly coupling said regulator means and said conduit.

16. The watering system of claim 13 further comprising a mounting bracket for attaching said regulator means to said mounting boss.

17. The watering system of claim 16 wherein said mounting bracket is secured to said regulator means by screws.

18. The watering system of claim 13 further comprising valve means for opening and closing said fluid communication between said regulator means and said conduit.

19. The watering system of claim 18 wherein said valve means includes a spring latch.

20. The watering system of claim 15 further comprising valve means for opening and closing said fluid communication between said regulator means and said conduit, said valve means disposed intermediate said T-joint and said regulator means.

21. The watering system of claim 20 wherein said support bracket includes a U-shaped portion and said valve means extends in a space defined between said support bracket U-shaped portion and said ballast member.

22. The watering system of claim 21 wherein said support bracket includes feet which engage and are guided on said ballast member, wherein said clamps can be adjusted so that said support bracket is movable on said ballast member.

23. The watering system of claim 22 wherein each said clamp includes a U-bolt assembly which engages one of said feet of said support bracket.

* * * * *